United States Patent [19]

Koziol

[11] Patent Number: 5,467,691
[45] Date of Patent: Nov. 21, 1995

[54] COOKING GRID

[75] Inventor: Walter Koziol, Antioch, Ill.

[73] Assignee: Modern Home Products Corp., Antioch, Ill.

[21] Appl. No.: 332,965

[22] Filed: Nov. 1, 1994

[51] Int. Cl.[6] .................................................. A47J 37/07
[52] U.S. Cl. ................................. 99/340; 99/445; 99/450
[58] Field of Search ............................. 99/450, 340, 425, 99/445

[56] References Cited

U.S. PATENT DOCUMENTS

| 2,459,657 | 1/1949 | Klein | 99/450 |
| 3,199,438 | 8/1965 | Myler et al. | 99/450 |
| 3,369,481 | 2/1968 | Pappas | 99/450 |
| 3,623,422 | 11/1971 | Marshall | 99/400 |
| 3,842,726 | 10/1974 | Fautz | 99/425 |
| 4,034,662 | 7/1976 | McLane | 99/445 |
| 4,428,281 | 1/1984 | Miller | 99/445 |
| 4,784,109 | 11/1988 | Korpan | 126/25 R |
| 4,979,440 | 12/1990 | Latour et al. | 99/445 |
| 5,105,725 | 4/1992 | Haglund | 99/446 |

FOREIGN PATENT DOCUMENTS 1139489  12/1955  France.

Primary Examiner—David Scherbel
Assistant Examiner—Reginald L. Alexander
Attorney, Agent, or Firm—Quarles & Brady

[57] ABSTRACT

A dual purpose cooking grid for use with a barbecue grill which has one side for cooking large pieces of food and an opposite side for cooking smaller ones. The grid provides for adequate flow of fats and juices to the heat source by providing grooves in a flat surface for cooking the small pieces of food which grooves direct some of the fats and juices to the source of heat. The grid is easily manufactured and has an aesthetic look.

8 Claims, 2 Drawing Sheets

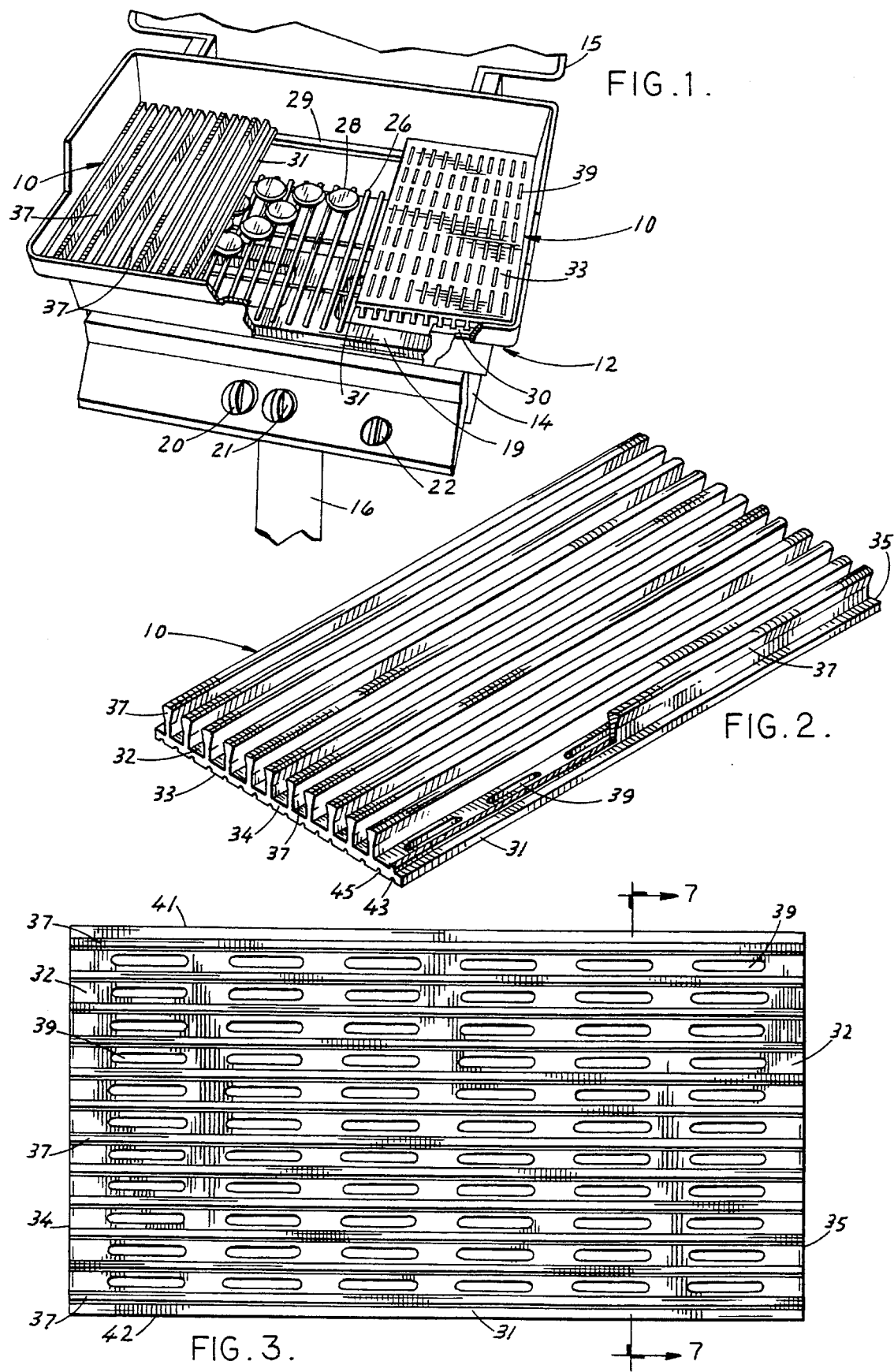

COOKING GRID

BACKGROUND OF THE INVENTION

This invention relates to a cooking grid for use in cooking food items. More particularly, the invention relates to a multipurpose cooking grid which can support meat and vegetable items whether of large or small pieces and can be used on one side to support the large pieces and on the opposing side to support the smaller ones. The multipurpose cooking grid of this invention is especially suited for use in conjunction with a gas grill.

There are currently available various types of cooking grids for use in conjunction with barbecue gas grills. For example, in U.S. Pat. No. 5,105,725 a cooking grid is disclosed for use with a gas grill having upstanding parallel elongated ribs with apertures in the trough-like bases between the ribs. In U.S. Pat. No. 4,979,440 there is disclosed a barbecue grill insert also having upstanding ribs and perforations therebetween to allow smoke to reach the food and allowing fat and grease from the food to drip down past the bars of the cooking grid. U.S. Pat. No. 4,428,281 shows grooves and openings for directing liquids from the cooking foods. U.S. Pat. No. 4,784,109 also shows a plurality of raised bars with a cover, and French patent 1,139,489 discloses a raised rib surface in a cooking grid with U-shaped troughs and apertures in the troughs. A grooved griddle is shown in U.S. Pat. No. 3,842,726.

The prior art does not provide a dual purpose cooking grid which is especially adapted for cooking a variety of food items and is designed to be inverted.

It is an advantage of the present invention to provide a cooking grid which in a single structure can accommodate different food items of various sizes.

It is another advantage of this invention to provide a cooking rack which efficiently directs the juices and fats from the cooked items to and away from the heat source.

It is another advantage of this invention to provide a multipurpose cooking rack of the foregoing type which is useful in conjunction with a gas barbecue grill.

It is yet another advantage of the invention to provide a cooking rack of the foregoing type which can be easily manufactured without special tooling and in an economical manner.

SUMMARY OF THE INVENTION

The foregoing advantages are accomplished by the present dual purpose cooking grid for use with a barbecue cooking grill having a heat source and support means for supporting the grid above the heat source. The grid includes a base member having opposing sides and composed of a heat conducting material. There are a multiplicity of essentially parallel spaced apart elongated ribs extending from one of the opposing sides of the base member. The base member has an essentially flat surface on the side opposite the side with the ribs. There are a multiplicity of openings extending through the base member and between the spaced apart ribs. A multiplicity of grooves are present in the other opposing side extending in an essentially parallel manner with the ribs, with some of the grooves interconnecting with the openings.

In one embodiment, a row of openings is positioned between a pair of the ribs with the openings of each row aligned with the opening of another row.

In another embodiment, the ribs are formed with an elongated curved head.

In one aspect, the grooves are spaced ½ inch from each other.

In another aspect, the ribs are spaced $^{11}/_{16}$" apart.

In yet another aspect, the heat conducting material is anodized aluminum.

In still another aspect, the grid of this invention is advantageously used in conjunction with a gas grill having flavor promoting rocks.

BRIEF DESCRIPTION OF THE DRAWINGS

A better understanding of the present dual purpose cooking grid will be accomplished by reference to the drawings wherein:

FIG. 1 is a front perspective view showing the dual purpose cooking grid in two different modes and positions in a gas-fired barbecue grill.

FIG. 2 is a top perspective view of the cooking grid with a portion shown in cross-section.

FIG. 3 is a top plan view of the cooking grid.

DESCRIPTION OF THE EMBODIMENTS

Figure 4:
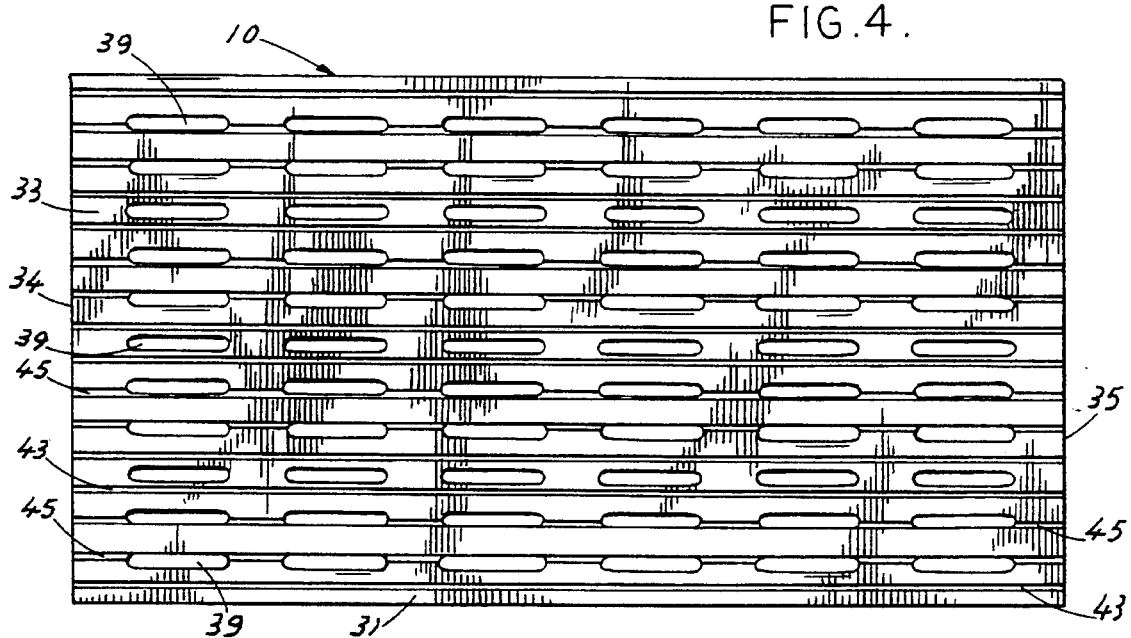
FIG. 4 is a bottom plan view of the cooking grid.
Figure 5:
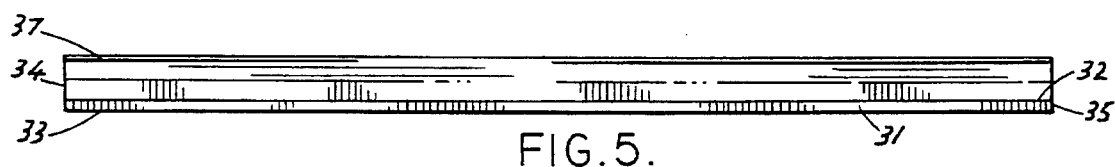
FIG. 5 is a side elevational view of the cooking grid.

Referring to FIG. 1, the cooking grid, generally 10, is shown in conjunction with a barbecue grill, generally 12, having the usual base 14 and a cover 15 with the base supported by a hollow post 16 which contains the usual gas supply line. The gas is controlled to the burner 19 by the customary valves which in turn are controlled by the control knobs 20, 21 and 22. Positioned above the burner in suitable manner in the base 14 is a grate 26 which supports the briquettes composed of the usual porous ceramic or rock material.

The cooking grid 10 of this invention is supported above the briquettes by a support rib 29 at the back of the base 14 and a flange 30 at the front.

Figure 6:
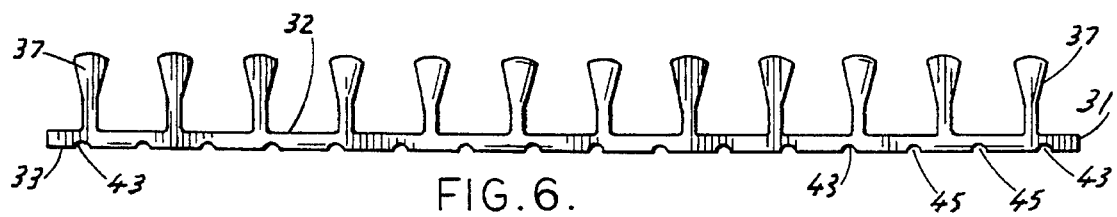
FIG. 6 is an end elevational view of the cooking grid.
Figure 7:
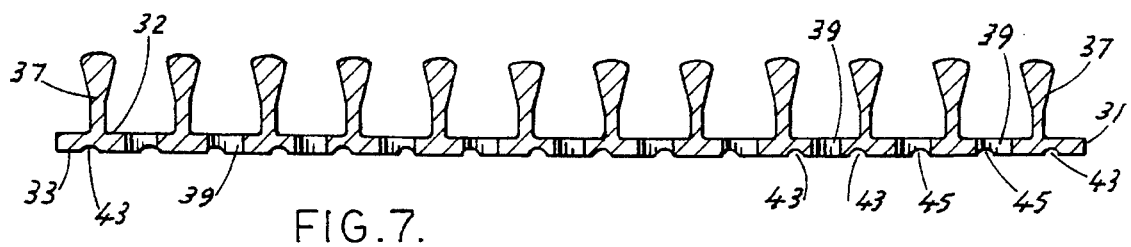
FIG. 7 is a view taken along line 7—7 of FIG. 3.

As best seen in FIGS. 2–5, cooking grid 10 has a plate-like base member 31 having an upper side 32 and a lower side 33. A multiplicity of ribs 37 extend upwardly from the base member and the upper side 32 where they are positioned parallel with each other. They are spaced preferably over the base member approximately $^{11}/_{16}$ of an inch. As best seen in FIG. 6, they have a conical shape in the form of an elongated curved head at the top which merges into a straight wall base portion. Between the ribs are slots or openings 39 which are spaced approximately ⅝ inch apart in rows between the ribs 37 and are aligned preferably from side to side with the slots of the other rows. The cooking grid is preferably eight inches wide as measured from side to side as indicated by numerals 41 and 42 and is fifteen and one-half inches long from end to end as shown by the numerals 34 and 35.

Looking at the bottom or lower side 33 of the cooking grid as shown in FIG. 4, there is presented a rather flat surface except for the grooves 43 and 45. It should be noted that grooves 43 extend from end to end of the grid without intersecting with the openings 39. In contrast, grooves 45 do intersect the openings 39. All of the grooves 43 and 45 are preferably spaced approximately ½ inch apart.

An important feature of the invention is the fact that this lower side 33 can be used as a cooking surface for cooking small pieces of food such as vegetables and seafood such as shrimp. This is best seen in FIG. 4. The grooves 45 will direct the juices or fats from the food to the openings 39 and downwardly to the briquettes 38 below so as to give the food the typical barbecue flavor. In contrast, grooves 43 would direct such juices or fats toward the back of the grill and away from the briquettes so there is not an excessive amount of smoke created. This is aided by having the grid positioned at a lower level on support rib 29 at the back of the grill.

The use of the grid 10 as both an upper and lower cooking surface is further illustrated in FIG. 1. The left side shows the cooking grid with the ribs 37 extending upwardly. There it would be utilized to cook the large pieces of food such as steaks, chops, chicken pieces or sausage. As shown on the right side, and with the lower side 33 in the upward position, it would be used to cook the previously referred to smaller pieces of food.

The preferred material for fabricating grid 10 is anodized aluminum. Other materials such as Teflon coated aluminum, cast iron, or porcelain steel could be used. However, these add to the cost.

It will thus be seen that through the present invention there is now provided a cooking grid which provides a dual cooking surface at both its top and bottom depending upon the types of food involved. In both cases, the grill assures that a sufficient amount of the fats and juices reach the briquettes so that the barbecue flavor is imparted to the food. This is particularly important in conjunction with the cooking of the smaller pieces of food where previously it was not considered feasible or important to provide this feature.

While the barbecue grid of this invention has been shown in conjunction with a gas barbecue, it is obvious that it could also be employed with a grill which is charcoal fired. Alternatively, it could be utilized in the usual oven.

The foregoing invention can now be practiced by those skilled in the art. Such skilled persons will know that this invention is not necessarily restricted to the embodiments presented herein. The scope of the invention is to be defined with the terms in the following claims as given meaning by the preceding description.

I claim:

1. A dual purpose cooking grid for use with a barbecue cooking grill having a heat source and support means for supporting the grid above the heat source, the grid comprising:

a base member having first and second opposed sides and composed of a heat conducting material;

a multiplicity of essentially parallel spaced apart elongated ribs extending from the first side of the base member; the base member defining an essentially flat and smooth surface on the second side opposite the side with the ribs;

a multiplicity of openings extending through the base member and between the spaced apart ribs; and a multiplicity of grooves in the second side extending in an essentially parallel manner with the ribs, with a first set of grooves interconnecting with the openings and a second set of grooves bypassing the openings to direct juices or fats produced during cooking of a food item heat source.

2. The dual purpose cooking grid of claim 1 wherein there is a row of openings positioned between a pair of the ribs and the openings of each row are aligned with the openings of other rows.

3. The dual purpose cooking grid of claim 1 wherein the ribs are formed with an elongated curved head.

4. The dual purpose cooking grid of claim 1 wherein the grooves are spaced approximately ½ inch apart.

5. The dual purpose cooking grid of claim 1 wherein the ribs are spaced approximately 11/16 inch apart.

6. The dual purpose cooking grid of claim 1 wherein the heat conducting material is anodized aluminum.

7. A gas fueled barbecue cooking unit comprising:

a gas barbecue cooking grill having a gas heat source and a cooking grate positioned above the heat source;

flavor promoting rocks placed on the grate;

support means in the grill for supporting a grid above the rocks;

the grid defined by:

a base member having first and second opposed sides and composed of a heat conducting material;

a multiplicity of essentially parallel spaced apart elongated ribs extending from the first side of the base member; the base member defining an essentially flat and smooth surface on the second side opposite the side with the ribs;

a multiplicity of openings extending through the base member and between the spaced apart ribs; and a multiplicity of grooves in the second side extending in an essentially parallel manner with the ribs, with a first set of grooves interconnecting with the openings and a second set of grooves bypassing the openings to direct juices or fats produced during cooking of a food item away from the heat source.

8. The gas fueled barbecue cooking unit as defined in claim 7 wherein the support means in the grill is of sufficient size to support at least two of the grids in opposing positions.

* * * * *

UNITED STATES PATENT AND TRADEMARK OFFICE
CERTIFICATE OF CORRECTION

PATENT NO. : 5,467,691
DATED : November 21, 1995
INVENTOR(S) : Walter Koziol

It is certified that error appears in the above-indentified patent and that said Letters Patent is hereby corrected as shown below:

Column 4, line 24, claim 1, line 18, after "food item" --away from the-- should be inserted--.

Signed and Sealed this

Ninth Day of April, 1996

Attest:

BRUCE LEHMAN

Attesting Officer

Commissioner of Patents and Trademarks